3,422,097
6,6-ETHYLENE SPIROLACTONES
James F. Kerwin, Broomall, Pa., assignor to Smith Kline
 & French Laboratories, Philadelphia, Pa., a corporation
 of Pennsylvania
No Drawing. Filed Aug. 27, 1965, Ser. No. 483,312
U.S. Cl. 260—239.57                           3 Claims
Int. Cl. C07c *173/00*

ABSTRACT OF THE DISCLOSURE 6,6-ethylenespirolactones are prepared by treatment of a 3-methoxyandrosta-3,5-diene spirolactone with the Vilsmeier reagent and then hydrolysis, reduction of the corresponding 6-formyl group, dehydration, and then reaction with dimethyl sulfoxonium methylide. 19-nor compounds are prepared via a 6-acetoxyethylandrosta-3,5-diene spirolactone. The products possess anabolic and androgenic activity.

---

This invention relates to 6,6-ethylene spirolactones having a high degree of hormonal activity. In particular, the invention relates to 3-(3-oxo-6,6-ethylene-17β-hydroxyandrost-4-en-17α-yl)propionic acid lactone, and the $\Delta^{1,2}$, 9α-fluoro, 11-oxygenated, and 19-nor analogs thereof, having androgenic and anabolic activity.

The compounds of the invention are thus represented by the following structural formulas:

where R is H, OH, or =O; X is H or F, with the proviso that when R is H, X is H; and the dotted line represents an optional double bond.

The preparation of certain of the compounds of Formula I is illustrated below for the preparation of the principal compound of the invention, 3-(3-oxo-6,6-ethylene-17β-hydroxyandrost-4-en-17α-yl)propionic acid lactone (III).

3 - (3 - oxo - 17β-hydroxyandrost-4-en-17α-yl)propionic acid lactone (IV) (U.S. 2,705,712) is converted to an enol ether (V) by treatment with trimethyl or triethyl orthoformate in the presence of an acid catalyst such as p-toluenesulfonic acid. The resulting 3-methoxy-(or ethoxy)-3,5-diene is formylated at the 6-position by treatment with the Vilsmeier reagent. This reagent, which consists of phosgene and dimethylformamide, reacts in an anhydrous medium with the diene at position 6 to give an iminium intermediate which is then hydrolyzed to the 6-formyl compound (VI). The formyl group is then reduced either catalytically or by means of lithium or sodium borohydride to give the 6-hydroxymethyl compound (VII), and this group is dehydrated with a reagent such as glacial acetic acid, p-toluenesulfonic acid, or sulfuric acid to give the 6-methylene compound VIII. The product III is formed by means of a reagent which is capable of adding a methylene group across the 6-methylene double bond. A suitable reagent is dimethyl sulfoxonium methylide,

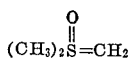

which is formed in situ by reaction of dimethyl sulfoxide methiodide with a strong base such as sodium hydride.

A further product compound of the invention, 3-(3-oxo - 6,6 - ethylene - 17β - hydroxyandrosta-1,4-dien-17α-yl)propionic acid lactone (IX) is prepared by treating Compound III with

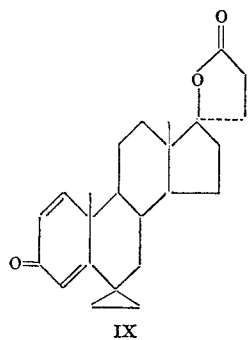

a reagent capable of introducing a double bond at the 1-2 position. The preferred reagent is 2,3-dichloro-5,6-dicyanobenzoquinone. As is well known in the art, microorganisms of 1,2-dehydrogenating potential may also be used for this purpose.

Compounds of Formula I having an 11-keto or 11β-hydroxy group, with or without a 9α-fluoro group, are prepared by starting with the appropriate 11 and/or 9-substituted Δ⁴-3-ketone and performing the same series of reactions as is described above for the preparation of Compound III. This series of reactions includes enol ether formation, formylation at the 6-position, reduction, dehydration, and finally reaction with dimethyl sulfoxonium methylide. The particular starting materials include the 11β-hydroxy, 11-keto, 11β-hydroxy-9α-fluoro, and 11-keto-9α-fluoro compounds described in J. Org. Chem. 25, 96 (1960). The Δ¹,² analogs are prepared as described above by reaction of the corresponding 1,2-saturated compounds with dichlorodicyanobenzoquinone.

The 19-nor compounds (estrenes) of Formula II are prepared by a sequence of reactions different from that used for the preparation of the compounds of Formula I. This sequence is illustrated below for the preparation of 3 - (3 - oxo - 6,6 - ethylene - 17β - hydroxyestr - 4 - en - 17α-yl)propionic acid lactone (X).

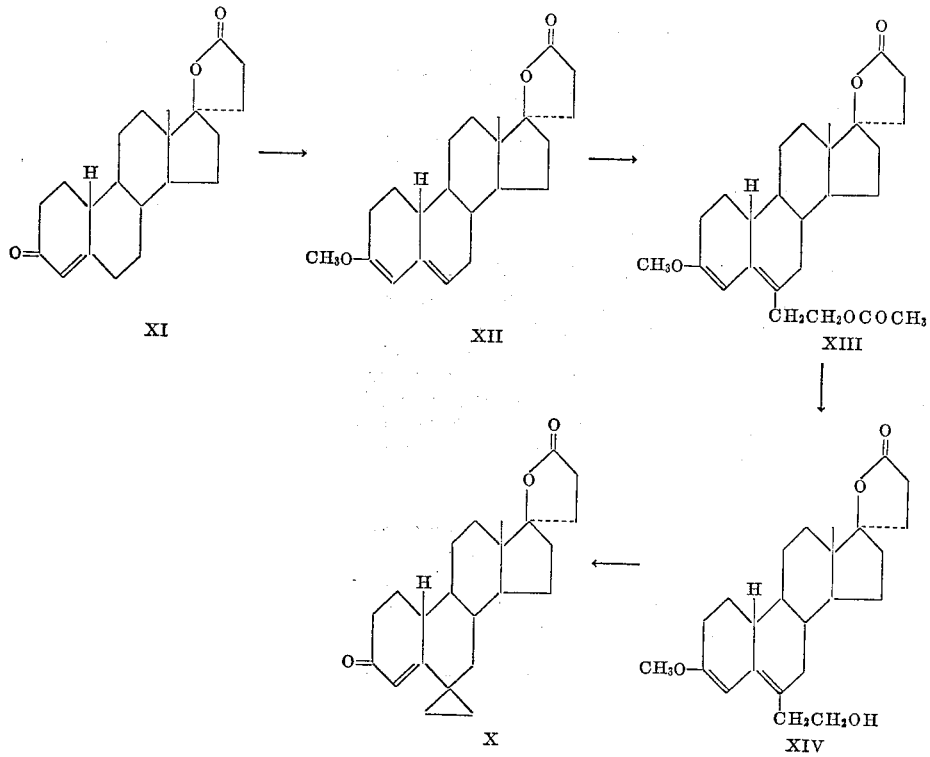

The starting material for the preparation of compounds of Formula II are described in J. Org. Chem., 24, 743 (1959) and J. Org. Chem., 25, 96 (1960).

Compound XI is conventionally converted to the enol ether XII by treatment with trimethyl or triethyl orthoformate and p-toluenesulfonic acid. This diene is then condensed at 0–5° in an ether or halogenated hydrocarbon solvent with 2-acetoxyethyl mercuric acetate [J. Am. Chem. Soc. 81, 5316 (1959)] in the presence of a Lewis acid such as boron trifluoride etherate. The resulting 6-(2-acetoxyethyl) diene XIII is then hydrolyzed with a weak base such as sodium or potassium carbonate to give the 6-(2-hydroxyethyl) compound XIV. The hydroxy group is then converted to a more reactive group such as the p-toluenesulfonate ester by reaction with a reagent such as p-toluenesulfonyl chloride in a base such as pyridine. Conversion to a halide, e.g., the chloride, is also suitable. This more reactive compound is then cyclized to X in pyridine containing a few percent of water.

The compound of Formula II in which R is keto is prepared by starting with an 11-keto compound and proceeding through the series of reactions described above. The 11β-hydroxy compound is obtained by reducing the 11-ketone with sodium borohydride in refluxing methanol and back-oxidizing the resulting 3,11-diol with dichlorodicyanobenzoquinone to obtain the 11β-hydroxy-3-ketone.

For purposes of the present invention, the alkali metal salts of the hydroxy acids which are hydrolytically derived from the lactones are equivalent to those lactones. The salts are formed in well-known manner by saponification of the lactones with an alkali metal hydroxide, and the lactones are reformed by treatment of the salts with acid.

The 6,6-ethylene spirolactone compounds of the invention, having androgenic and anabolic activity, are useful in those instances in which it is desired to stimulate the androgenic response and/or to increase body weight and build muscle tissue. The principal compound of the invention, 3 - (3-oxo-6,6-ethylene-17β-hydroxyandrost-4-en-17α-yl)propionic acid lactone (III), has been found to exert a potent androgenic and anabolic effect when administered subcutaneously and orally to rats at a dose of about 2.5–20 mg./kg. A solution in sesame oil is an effective vehicle for administration. Other formulations which are obvious to those skilled in the art of pharmaceutical chemistry may also be employed. Compound III also is active as a natriuretic agent and increases blood glucose levels.

The following examples are intended to illustrate the preparation of the compounds of the invention, but are not to be construed as limiting the scope thereof. Various obvious modifications in the compounds or in the processes for preparing them will occur to those skilled in the art of organic chemistry, and such modifications are to be considered part of the invention.

EXAMPLE 1

3-(3-methoxy-17β-hydroxyandrosta-3,5-dien-17α-yl) propionic acid lactone

A mixture of 15.5 g. of 3-(3-oxo-17β-hydroxy-androst-4-en-17α-yl)propionic acid lactone, 20 ml. of trimethyl orthoformate, and 40 ml. of dioxane containing 0.2 g. of p-toluenesulfonic acid is warmed with stirring to effect solution.

Precipitation of the product occurs after a few minutes and the mixture is allowed to cool to room temperature with stirring during 2 hours. After the addition of 2 ml. of pyridine followed by 25 ml. of water, the stirred mixture is cooled and filtered. The filter cake is washed with aqueous methanol and dried at 25° under vacuum to give pure 3 - (3-methoxy-17β-hydroxyandrosta-3,5-dien-17α-yl)propionic acid lactone, M.P. 209–219°.

EXAMPLE 2

3-(3-methoxy-6-formyl-17β-hydroxyandrosta-3,5-dien-17α-yl)propionic acid lactone A cold solution of 4.8 g. of phosgene in 37 ml. of methylene chloride is slowly added with stirring at 0° to 7.3 ml. of dimethylformamide in 110 ml. of methylene chloride. After 10 minutes a solution of 15 g. of the diene of Example 1 in 85 ml. of methylene chloride containing 1 ml. of pyridine is added and the reaction mixture is stirred for 3 hours at room temperature. The reaction mixture is again cooled and slowly treated with 10.5 g. of sodium acetate in 210 ml. of water at 0° and allowed to warm to room temperature. The organic phase is separated, washed with water, dried, and evaporated to a crystalline mass. Recrystallization from ethyl acetate containing a little pyridine gives 3-(3-methoxy-6-formyl-17β-hydroxyandrosta-3,5-dien-17α-yl)propionic acid lactone, M.P. 179–192°.

EXAMPLE 3

3-(3-methoxy-6-hydroxymethyl-17β-hydroxyandrosta-3,5-dien-17α-yl)propionic acid lactone To a stirred suspension of 9.7 g. of the aldehyde of Example 2 in 350 ml. of methanol is added a solution of 3.8 g. of sodium borohydride in 15 ml. of cold water. The addition is carried out during 5 minutes at 0° with stirring, and the reaction mixture is then allowed to warm to room temperature during 1 hour, poured into water and filtered. The filter cake is washed with water, dried and recrystallized from ether to give 3-(3-methoxy-6-hydroxymethyl - 17β - hydroryandrostra-3,5-dien-17α-yl)-propionic acid lactone, M.P. 159–170°.

EXAMPLE 4

3-(3-oxo-6-methylene-17β-hydroxyandrost-4-en-17α-yl)propionic acid lactone

A suspension of 7.2 g. of the hydroxymethyl compound of Example 3 in 70 ml. of water and 210 ml. of glacial acetic acid is stirred with warming to effect solution. After 15 minutes the solution is diluted with water and extracted with methylene chloride. The methylene chloride extracts are washed with sodium carbonate solution, combined, dried, and evaporated to a residue. The residue is dissolved in methylene chloride, filtered through 100 g. of activity III Woelm alumina, evaporated, and crystallized from ether-hexane to give 3-(3-oxo-6-methylene-17β-hydroxyandrost-4-en-17α-yl)propionic acid lactone, M.P. 135–139°.

EXAMPLE 5

3-(3-oxo-6,6-ethylene-17β-hydroxyandrost-4-en-17α-yl)propionic acid lactone

To a solution of 3.22 g. of trimethylsulfoxonium iodide in 40 ml. of dimethylsulfoxide is added 0.59 g. of a 55.6% dispersion of sodium hydride in mineral oil. The addition is carried out in portions, with stirring and under a nitrogren atmosphere. When reaction is complete (about 30 minutes), 4.28 g. of 3-(3-oxo-6-methylene-17β-hydroxyandrost-4-en-17α-yl)propionic acid lactone in 40 ml. of dimethyl sulfoxide is added. The reaction mixture is stirred for 1 hour at room temperature and then at 50–55° for 2 hours. It is then poured into water and extracted with benzene. The benzene extracts are washed with water, dried and evaporated to a residue. The crude product is purified by chromatography on 110 g. of activity III Woelm alumina. Elution with benzene-petroleum ether (2:1) and benzene gives 3-(3-oxo-6,6-ethylene-17β-hydroxyandrost-4-en-17α-yl)propionic acid lactone, which after recrystallization from ether-hexane has M.P. 162–164°, ultraviolet absorption: λ max. 249 mµ (ε14,800).

EXAMPLE 6

3-(3-oxo-6,6-ethylene-17β-hydroxyandrosta-1,4-dien-17α-yl)propionic acid lactone A solution of 1.82 g. of 3-(3-oxo-6,6-ethylene-17β-hydroxyandrost-4-en-17α-yl)propionic acid lactone and 1.5 g. of 2,3-dichloro-5,6-dicyanobenzoquinone in 50 ml. of dioxane is refluxed for ca. 18 hours. The solution is filtered, the filtrate evaporated to dryness, and the residue taken up in ethyl acetate. The solution is washed with water and then dried and evaporated to give the title compound.

EXAMPLE 7

3-(3-oxo-6,6-ethylene-11β,17β-dihydroxy-9α-fluoroandrost-4-en-17α-yl)propionic acid lactone A mixture of 17.1 g. of 3-(3-oxo-11β,17β-dihydroxy-9α-fluoroandrost-4-en-17α-yl)propionic acid lactone, [J. Org. Chem. 25, 96 (1960)], 20 ml. of trimethyl orthoformate, and 40 ml. of dioxane containing 0.2 g. of p-toluenesulfonic acid is warmed and then worked up as in Example 1 to give the 3-methoxy-3,5-diene.

This diene (16.4 g.) is then treated with 4.8 g. of phosgene and 7.3 ml. of dimethylformamide as in Example 2 to give the 3-methoxy-6-formyl-3,5-diene.

This formyl compound (10.6 g.) is then reduced with 3.8 g. of sodium borohydride in cold methanol as described in Example 3 to give the 6-hydroxymethyl compound.

A suspension of 7.8 g. of the hydroxymethyl compound in 70 ml. of water and 210 ml. of glacial acetic acid is treated and worked up as in Example 4 to give the 6-methylene compound.

Reaction of 4.7 g. of the 6-methylene compound with 3.22 g. of trimethyl sulfoxonium iodide and 0.59 g. of sodium hydride dispersion in dimethyl sulfoxide as in Example 5 gives the title product.

EXAMPLE 8

When the following starting materials in the stated quantities are subjected to the reactions as described in Examples 1–5, the respective listed products are obtained.

Starting materials 3-(3,11-dioxo-17β-hydroxy-9α-fluoroandrost-4-en-17α-yl)propionic acid lactone (16.9 g.)
3-(3-oxo-11β,17β-dihydroxyandrost-4-en-17α-yl)propionic acid lactone (16.3 g.)
3-(3,11-dioxo-17β-hydroxyandrost-4-en-17α-yl) propionic acid lactone (16.2 g.)

Products 3-(3,11-dioxo-6,6-ethylene-17β-hydroxy-9α-fluoro-androst-4-en-17α-yl)propionic acid lactone
3-(3-oxo-6,6-ethylene-11β,17β-dihydroxyandrost-4-en-17α-yl)propionic acid lactone
3-(3,11-dioxo-6,6-ethylene-17β-hydroxyandrost-4-en-17α-yl)propionic acid lactone

EXAMPLE 9

When the following starting materials in the stated quantities are subjected to the action of 1.5 g. of 2,3-dichloro-5,6-dicyanobenzoquinone as described in Example 6, the corresponding androsta-1,4-dienes are obtained.

3-(3-oxo-6,6-ethylene-11β,17β-dihydroxy-9α-fluoroandrost-4-en-17α-yl)propionic acid lactone (1.99 g.)
3-(3,11-dioxo-6,6-ethylene-17β-hydroxy-9α-fluoroandrost-4-en-17α-yl)propionic acid lactone (1.97 g.)
3-(3-oxo-6,6-ethylene-11β,17β-dihydroxyandrost-4-en-17α-yl)propionic acid lactone (1.90 g.)
3-(3,11-dioxo-6,6-ethylene-17β-hydroxyandrost-4-en-17α-yl)propionic acid lactone (1.89 g.)

EXAMPLE 10

3-(3-oxo-6,6-ethylene-17β-hydroxyestr-4-en-17α-yl)propionic acid lactone

A solution of 51 g. of 3-(3-oxo-17β-hydroxyestr-4-en-17α-yl)propionic acid lactone in 65 ml. of dioxane and 50 ml. of trimethyl orthoformate is treated with 0.25 g. of p-toluenesulfonic acid with stirring. After 8 hours the reaction mixture is quenched with pyridine, cooled and diluted with 115 ml. of water. The product is collected by filtration and recrystallized from alcohol-water containing a few drops of pyridine to yield 3-(3-methoxy-17β-hydroxyestra-3,5-dien-17α-yl)propionic acid lactone.

To a stirred solution of 3.42 g. of the diene and 5.2 g. of 2-acetoxyethyl mercuric acetate [K. Ichikawa, K. Fujita and H. Ouchi, J. Am. Chem. Soc., 81, 5316 (1959)] in 20 ml. of methylene chloride is added 0.3 ml. of boron trifluoride etherate. The addition is carried out dropwise under nitrogen at 0°. The reaction mixture is maintained at 0° with stirring for 3 hours, quenched with 2 ml. of pyridine, diluted with methylene chloride, decanted from precipitated mercury, washed with dilute sodium carbonate solution, dried, and evaporated to a residue. The residue is dissolved in 50 ml. of benzene-petroleum ether (1:2) and filtered through a column of 60 g. of activity III Woelm alumina. The column is washed with 200 ml. of the same solvent mixture and the total filtrate is evaporated to yield crude 3-(3-methoxy-6-(2-acetoxyethyl)-17β-hydroxyestra-3,5-dien-17α-yl)propionic acid lactone, which is used directly in the next step.

A solution of 0.5 g. of the acetate in 15 ml. of alcohol is refluxed with 5 ml. of aqueous sodium carbonate for 45 minutes. The cooled reaction mixture is diluted with water and extracted with methylene chloride. The methylene chloride extracts are dried and evaporated to a residue which is crystallized to give 3-(3-methoxy-6-(2-hydroxyethyl)-17β-hydroxyestra-3,5-dien-17α-yl)propionic acid lactone.

A solution of 0.10 g. of the hydroxyethyl compound in 1 ml. of pyridine is treated with 0.09 g. of p-toluenesulfonyl chloride at 0°. After 1.5 hours at 0° the reaction mixture is warmed to 27° for 0.5 hour, treated with 3 drops of water and allowed to stand for 16 hours. The reaction mixture is diluted with water and extracted with methylene chloride. After washing the methylene chloride extract with cold, dilute phosphoric acid, it is dried and evaporated to a residue. The residue is dissolved in 10 ml. of benzene-petroleum ether (1:1) and chromatographed on 4 g. of activity III Woelm alumina. Elution with benzene and benzene-methylene chloride (3:1) gives the title product.

EXAMPLE 11

When 52.9 g. of 3-(3,11-dioxo-17β-hydroxyestr-4-en-17α-yl)propionic acid lactone is subjected to the series of reactions described in Example 10, including enol ether formation, acetoxyethylation, hydrolysis, and ring-closure, 3-(3,11-dioxo - 6,6 - ethylene - 17β - hydroxyestra - 4 - en-17α-yl)propionic acid lactone is obtained.

To a stirred suspension of 4.8 g. of this 11-keto compound in 350 ml. of methanol is added with cooling a suspension of 3.8 g. of sodium borohydride in 15 ml. of methanol. The reaction mixture is then refluxed for 3 hours, poured into water, and filtered. The filter cake is washed with water, dried, and recrystallized to give 3-(3,11β,17β - trihydroxy - 6,6 - ethyleneestr - 4 - en - 17α-yl) propionic acid lactone.

A solution of 1.82 g. of this 3-alcohol and 1.5 g. of 2,3-dichloro-5,6-dicyanobenzoquinone in 50 ml. of dioxane is allowed to stand at room temperature for ca. 12 hours. The solution is filtered, the filtrate evaporated to dryness, and the residue taken up in ethyl acetate. The solution is washed with water, dried and evaporated to give 3-(3-oxo - 6,6 - ethylene - 11β,17β - dihydroxyestr - 4 - en-17α-yl)propionic acid lactone.

I claim:
1. A compound having the formula

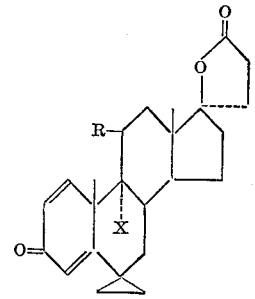

where R is H, OH, or =O; and X is H or F, with the proviso that when R is H, X is H; or a 1,2-dihydro analog when X is F.

2. 3 - (3 - oxo - 6,6 - ethylene - 17β - hydroxyandrosta-1,4-dien-17α-yl)propionic acid lactone.

3. 3 - (3 - oxo - 6,6 - ethylene - 11β,17β - dihydroxy-9α-fluoroandrost-4-en-17α-yl)propionic acid lactone.

References Cited

UNITED STATES PATENTS 3,261,829    7/1966    Colton et al. _____ 260—239.5

LEWIS GOTTS, *Primary Examiner.*

ETHEL G. LOVE, *Assistant Examiner.*

U.S. Cl. X.R.

260—999